(12) United States Patent
Feinstein et al.

(10) Patent No.: US 12,369,695 B1
(45) Date of Patent: Jul. 29, 2025

(54) BAND EMPLOYING BISTABLE MAGNETIC ACTUATOR

(71) Applicant: Peter A Feinstein Patents, LLC, Palm Beach Gardens, FL (US)

(72) Inventors: Peter A. Feinstein, Palm Beach Gardens, FL (US); Ivyann Oveson Running, Orem, UT (US); Andrew Geyser, Fort Collins, CO (US); Brian Jensen, Orem, UT (US); Nathan Usevitch, Vineyard, UT (US); Carter Stentzel, San Antonio, TX (US)

(73) Assignee: Peter A Feinstein Patents LLC, Palm Beach Gardens, FL (US)

( * ) Notice: Subject to any disclaimer, the term of this patent is extended or adjusted under 35 U.S.C. 154(b) by 0 days.

(21) Appl. No.: 19/076,592

(22) Filed: Mar. 11, 2025

Related U.S. Application Data

(60) Provisional application No. 63/564,787, filed on Mar. 13, 2024.

(51) Int. Cl.
*A44C 5/12* (2006.01)
*A44C 5/00* (2006.01)
(Continued)

(52) U.S. Cl.
CPC .............. *A44C 5/08* (2013.01); *A44C 5/0053* (2013.01); *A44C 5/2071* (2013.01)

(58) Field of Classification Search
CPC ....... A44C 5/08; A44C 5/0053; A44C 5/2071; A44C 5/105; A44C 5/107; A44C 5/12; A44C 5/14; A44C 5/147; A44D 2203/00
See application file for complete search history.

(56) References Cited

U.S. PATENT DOCUMENTS

| 265,044 | A | * | 9/1882 | Engelmann | ............... | A44C 5/12 |
| | | | | | | D11/4 |
| 285,041 | A | * | 9/1883 | King | ......................... | A44C 5/12 |
| | | | | | | 63/9 |

(Continued)

OTHER PUBLICATIONS

Pece, F., "MagTics: Flexible and Thin Form Factor Magnetic Actuators for Dynamic and Wearable Haptic Feedback"; UIST Oct. 22, 2017 Retrieved on Jan. 28, 2025 from https://www.epfl.ch/labs/lmts/wp-content/uploads/2019/02/mag-tics-uist-lowres.pdf.

(Continued)

*Primary Examiner* — Jack W Lavinder
(74) *Attorney, Agent, or Firm* — Forge IP, PLLC

(57) ABSTRACT

A band includes at least three members pivotably connected to one another so as to be pivotable between open and closed positions. A first member includes first and second permanent magnets disposed at opposite ends thereof, a second member includes a third permanent magnet and a third member includes a fourth permanent magnet. The first and second members are configured such that when they are pivoted with respect to each other past a threshold position toward the closed position, they are biased toward the closed position by forces created by the first and third magnets and when they are pivoted with respect to each other past the threshold position toward the open position, they are biased toward the open position by forces created by the first and third magnets. The first and third members are similarly biased by forces created by the second and fourth magnets.

34 Claims, 9 Drawing Sheets

(51) Int. Cl.
*A44C 5/08* (2006.01)
*A44C 5/14* (2006.01)
*A44C 5/20* (2006.01)

(56) References Cited

U.S. PATENT DOCUMENTS

| | | | | |
|---|---|---|---|---|
| 290,590 | A | * | 12/1883 | Lettre .................... A44C 5/12 63/3 |
| 300,286 | A | * | 6/1884 | Salisbury ................ A44C 5/12 224/174 |
| 2,009,254 | A | | 7/1935 | Feid |
| 2,707,800 | A | * | 5/1955 | Popper .................. G04B 37/12 16/296 |
| 2,787,893 | A | * | 4/1957 | Canning ................. A44C 5/12 63/9 |
| 3,805,548 | A | * | 4/1974 | Matwijcow ............. A44C 5/12 63/11 |
| 3,940,038 | A | * | 2/1976 | Claude ................... A44C 5/12 59/79.1 |
| 9,141,086 | B1 | | 9/2015 | Rohrbach |
| 9,668,550 | B2 | | 6/2017 | Seo et al. |
| 9,924,766 | B2 | | 3/2018 | De Iuliis et al. |
| 10,123,608 | B2 | | 11/2018 | Kosoglow et al. |
| 10,362,855 | B2 | | 7/2019 | Whang et al. |
| 10,455,900 | B2 | | 10/2019 | Feinstein |
| 11,428,366 | B2 | | 8/2022 | Ahi |
| 2003/0116596 | A1 | * | 6/2003 | Terasawa ............. A44C 5/0007 224/179 |
| 2006/0048543 | A1 | * | 3/2006 | Kessler ................ A44C 15/005 63/40 |
| 2021/0048841 | A1 | * | 2/2021 | Liu .......................... G09G 5/10 |
| 2024/0188694 | A1 | | 6/2024 | Vartanov et al. |

OTHER PUBLICATIONS

Pruett, Hunter T., "Actuation and Stabilization of Volume-Efficient Origami-Inspired Mechanisms" (2024); Theses and Dissertations. 10578. https://scholarsarchive.byu.edu/etd/10578.

* cited by examiner

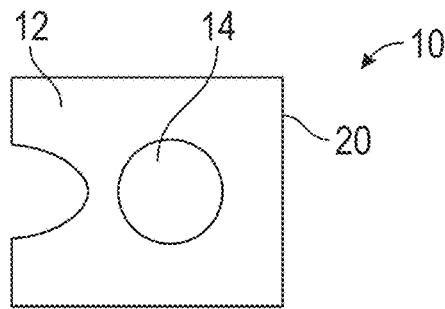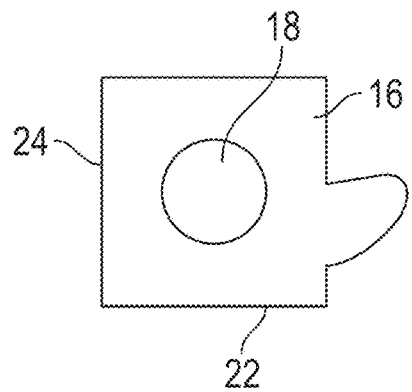
FIG. 2
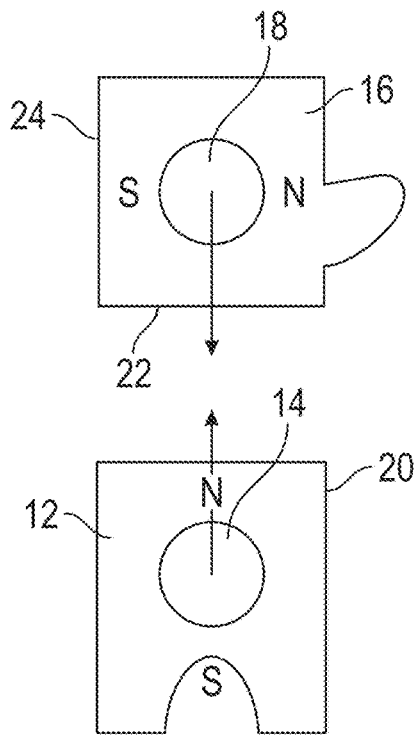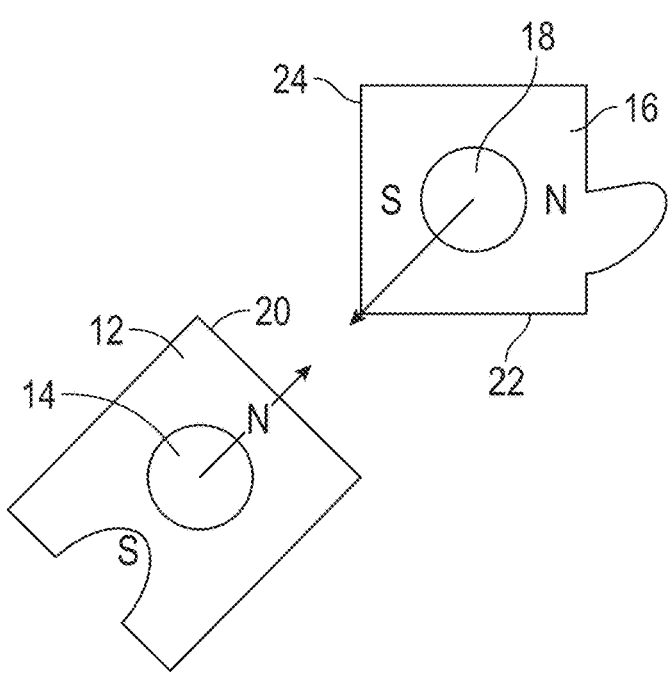
FIG. 3A
FIG. 3B
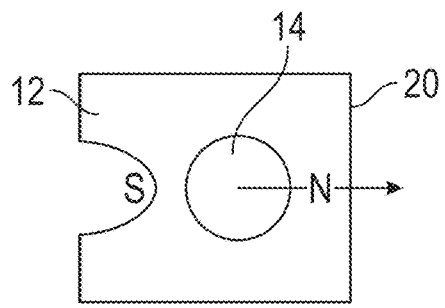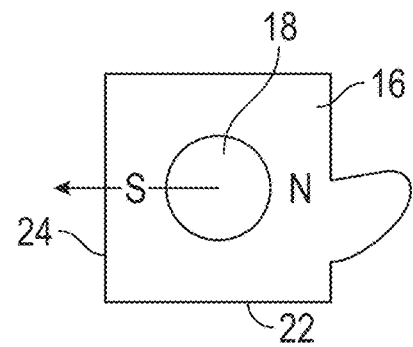
FIG. 3C

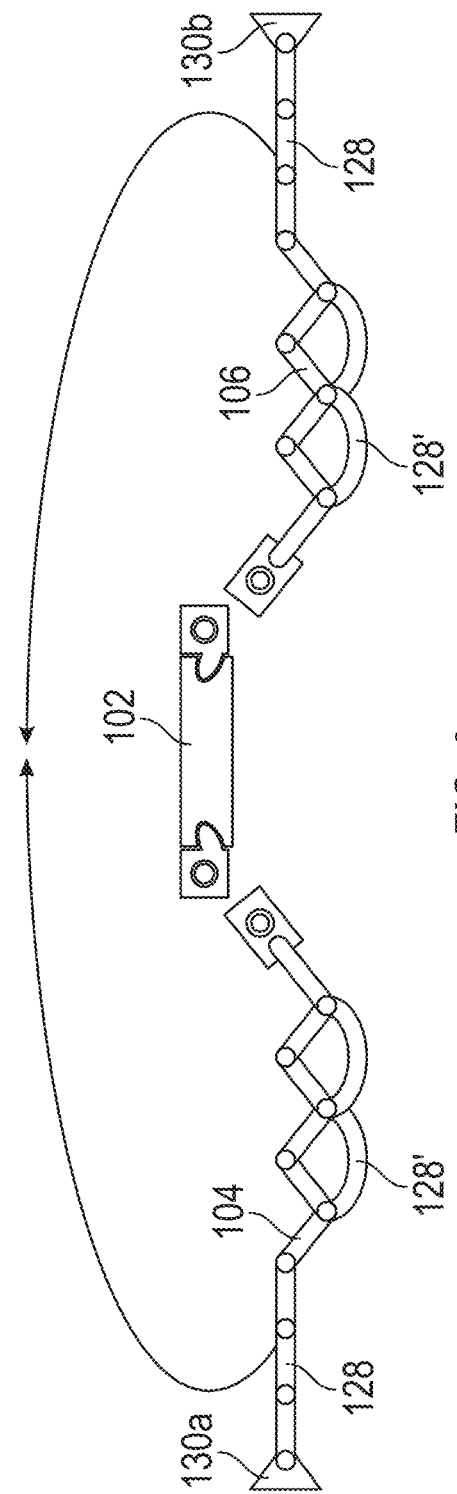
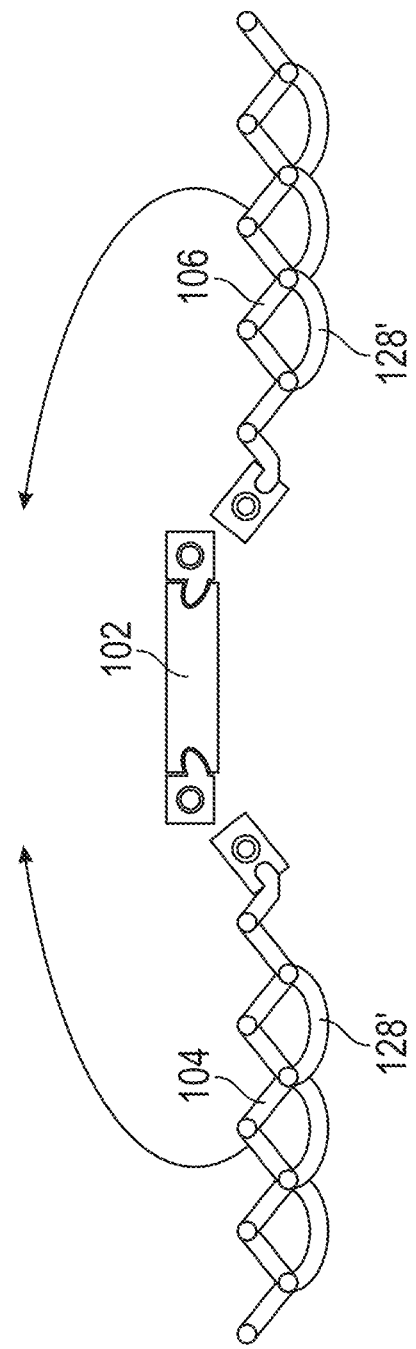

BAND EMPLOYING BISTABLE MAGNETIC ACTUATOR

FIELD OF THE INVENTION

This disclosure relates generally to bands of material, such as for a watchband or other attachment or fixation system, employing bistable magnetic actuators to achieve a biased-open configuration and a biased-closed configuration of the band.

BACKGROUND OF THE INVENTION

Electronic devices and other apparatuses, such as wearable devices like smart watches, heart rate monitors, or fitness monitors, may be attached to one or more body parts of a user utilizing attachment structures, such as bands. To meet various fitting requirements, it is preferred that wearable bands have open and closed positions, and that is relatively easy for the wearer to switch between the two. It is further preferred that wearable bands, especially those to be worn on a wrist or arm, require very simple one-handed operation. Most preferable would be a wearable band that required no use of the opposite hand other than to position or place the object on the desired location, after which the band is capable of completing the attachment by itself automatically as a hands-free operation upon activation or triggering by the wearer.

Conventional bands, such as watch bands, jewelry bands, magnetic health bands, bracelets, and necklaces, typically include expanding linkages and non-expanding linkages. However, such bands often are very delicate and flimsy and do not hold up well to physical exercise, fitness activities and sports.

Most conventional bands use clasps to open and close the bands. Traditional clasp mechanisms come in various forms. Buckle and tether clasp mechanisms rely on mechanical features to keep the band or flap closed. Buckle and tether mechanisms can provide one-handed operation and can be adjusted, but they are often not easy to use in one handed operation. Hook-and-loop fasteners, such as Velcro®-like fasteners, can be adjusted and opened or closed by one hand, but they are not aesthetically pleasing. Button and hole clasps can be adjustable if there are multiple holes, but they are difficult to operate one-handed and the length adjustment is limited by the locations of the holes. Magnetic closure mechanisms use a post and hole configuration for alignment of the magnetic closure for mechanical retention in shear. Such magnetic closures are operable by one-hand but have limitations when used alone.

Generally, conventional bands with clasps require somewhat complicated manipulation by the wearer, which may make them difficult to wear for those with various disabilities, for the very young, for the very old, etc. Thus, there is still a need to provide an improved wearable band which is suitable for one handed or even hands free operation. Desirably, the wearable band is able to clasp automatically upon putting onto a body with little if any input required for the wearer to activate/trigger the band from the opened to the closed position.

The present invention, therefore, aims to remedy the problems associated with known bands by providing a band, such as a watch band or other wearable band, that is suitable for very simple one handed or hands free operation and that can assemble around a body part upon being positioned onto the body part with little, if any, input required for the wearer to activate/trigger the band from the opened to the closed position.

SUMMARY OF THE INVENTION

The present invention achieves these objectives by providing a band of material, such as for a watchband or other attachment or fixation system, utilizing one or more bistable magnetic actuators to achieve bias opened and bias closed configurations.

It has been proposed to employ bistable magnetic arrangements in connection with bistable hinge designs and the like, with two stable equilibrium positions separated by an unstable equilibrium position. These arrangements gain their bistable behavior from the energy created by permanent magnets and their acting to attract or repel one another depending on the relative positioning between the two. This approach integrates desired mechanism motion and magnetic energy to create bistable arrangements with dramatically reduced part count compared to traditional mechanisms incorporating rigid links, joints, and springs. As a deflection is applied to the arrangement (causing relative movement between the magnets), the arrangement rapidly transitions from one stable position to the other. The force-deflection response for a typical bistable mechanism is illustrated schematically and graphically in FIG. 1A and FIG. 1B.

As can be seen, bistable magnetic arrangements do not require power to be held in either of their stable positions (as indicated at Theta positions of 0° and 180° in FIG. 1B and the corresponding magnet positions in FIG. 1A). As can also be seen, as the magnets are rotated with respect to each other toward a Theta of 90°, forces are created urging the magnets back to their stable 0° position. However, once a Theta of 90° is reached, (note peak of graph), the magnets now start to urge one another toward the second stable position at 180°. Thus, the two stable equilibrium positions are defined at Theta positions of 0° and 180° separated by an unstable equilibrium position (with peak energy storage at a Theta of) 90°.

The present invention incorporates bistable magnetic arrangements to create actuators incorporated into the inventive band of material, such as for a watchband or other wearable band.

In accordance with one particular exemplary embodiment of the present invention, a band configured to wrap around and be secured to an object includes at least three members pivotably connected to one another so as to be pivotable with respect to each other between an open position and a closed position. A first member of the at least three members comprises a first permanent magnet and a second permanent magnet disposed at opposite ends thereof, a second member of the at least three members comprises a third permanent magnet and a third member of the at least three members comprises a fourth permanent magnet. The first and second members are configured such that when the first and second members are pivoted with respect to each other past a threshold position toward the closed position, the first and second members are biased toward the closed position by forces created by the first and third magnets and when the first and second members are pivoted with respect to each other past the threshold position toward the open position, the first and second members are biased toward the open position by forces created by the first and third magnets. The first and third members are configured such that when the first and third members are pivoted with respect to each other past a threshold position toward the closed position, the first and third members are biased toward the closed position by forces created by the second and fourth magnets and when the first and third members are pivoted with respect to each other past the threshold position toward the open position, the first and third members are biased toward the open position by forces created by the second and fourth magnets.

In some embodiments, the second and third members are pivotably connected to the first member at opposite ends thereof. In certain of these embodiments, the first member comprises a watch body, the second member comprises a first watch strap, and the third member comprises a second watch strap, whereby the band comprises a watch.

In some embodiments, the band further includes a closure affixing the second member and the third member together when the second and third members are in the closed position. In certain of these embodiments, the closure comprises a magnetic closure.

In some embodiments, at least one of the second member and the third member comprises a flexible material. In some embodiments, at least one of the second member and the third member comprises a plurality of links. In certain of these embodiments, at least some of the plurality of links comprise bistable compliant links. In certain embodiments, at least some of the plurality of links comprise passive links. In certain embodiments, the plurality of links comprise a combination of bistable compliant links and passive links.

In some embodiments, the open position and the closed position comprise stable positions such that the open position and the closed position are maintained without external forces being applied thereto. In certain of these embodiments, rotational positions of the first and second members with respect to each other and rotational positions of the first and third members with respect to each other between the open position and the closed position comprise unstable positions so as to require external forces to be applied in order to maintain rotational positions of the first and second members with respect to each other and rotational positions of the first and third members with respect to each other between the open position and the closed position.

In some embodiments, the first member comprises a first planar surface and a second planar surface at a first end thereof, the first and second planar surfaces defining an angle therebetween, the first member comprises a third planar surface and a fourth planar surface at a second end thereof, the third and fourth planar surfaces defining an angle therebetween, the second member comprises a planar surface, and the third member comprises a planar surface. The planar surface of the second member abuts the first planar surface of the first member when in the open position and the planar surface of the second member abuts the second planar surface of the first member when in the closed position, and the planar surface of the third member abuts the third planar surface of the first member when in the open position and the planar surface of the third member abuts the fourth planar surface of the first member when in the closed position. In certain of these embodiments, the angle between the first and second planar surfaces of the first member is 90 degrees and the angle between the third and fourth planar surfaces of the first member is 90 degrees.

In some embodiments, the band further includes a first pivot element configured to allow the first and second members to pivot with respect to one another, while preventing the first and second members from separating, and a second pivot element configured to allow the first and third members to pivot with respect to one another, while preventing the first and third members from separating.

In some embodiments, the band defines an article of jewelry or a watch. In some embodiments, the band defines a medical article selected from the group consisting of a medical instrument holder, a cuff attachment for scrubs, a compression bandage, a blood pressure cuff, and a cuff for affixing cold or heat wraps. In some embodiments, the band defines a safety tether for a gaming device. In some embodiments, the band is incorporated into a flexible mobile communications device adapted to wrap around a body part.

In accordance with another aspect of the present invention, a wearable device includes a body, a first strap pivotably connected at an end thereof to a first end of the body and a second strap pivotably connected at an end thereof to a second end of the body, opposite the first end, the first and second straps being pivotable with respect to the body between an open position and a closed position. The first strap comprises a permanent magnet adjacent the end thereof, the second strap comprises a permanent magnet adjacent the end thereof and the body comprises a first permanent magnet adjacent the first end thereof and a second permanent magnet adjacent the second end thereof. The first strap and the body are configured such that when the first strap and the body are pivoted with respect to each other past a threshold position toward the closed position, the first strap and the body are biased toward the closed position by forces created by the magnet of the first strap and the first magnet of the body and when the first strap and the body are pivoted with respect to each other past the threshold position toward the closed position, the first strap and the body are biased toward the closed position by forces created by the magnet of the first strap and the first magnet of the body. The second strap and the body are configured such that when the second strap and the body are pivoted with respect to each other past a threshold position toward the closed position, the second strap and the body are biased toward the closed position by forces created by the magnet of the second strap and the second magnet of the body and when the second strap and the body are pivoted with respect to each other past the threshold position toward the closed position, the second strap and the body are biased toward the closed position by forces created by the magnet of the second strap and the second magnet of the body.

In some embodiments, the body comprises a watch body and the first and second straps comprise watch straps, whereby the device comprises a watch. In some embodiments, the device further includes a closure affixing the first strap and the second strap together when the first strap and the second strap are in the closed position. In some embodiments, the closure comprises a magnetic closure.

In some embodiments, at least one of the first strap and the second strap comprises a flexible material. In some embodiments, at least one of the first strap and the second strap comprises a plurality of links. In certain of these embodiments, at least some of the plurality of links comprise bistable compliant links. In certain embodiments, at least some of the plurality of links comprise passive links. In certain embodiments, the plurality of links comprise a combination of bistable compliant links and passive links.

In some embodiments, the open position and the closed position comprise stable positions such that the open position and the closed position are maintained without external forces being applied thereto. In certain of these embodiments, rotational positions of the first strap and second strap with respect to the body between the open position and the closed position comprise unstable positions so as to require external forces to be applied in order to maintain rotational positions of the first strap and the second strap with respect to the body between the open position and the closed position.

In some embodiments, the body comprises a first planar surface and a second planar surface at the first end thereof, the first and second planar surfaces defining an angle therebetween, the body comprises a third planar surface and a fourth planar surface at the second end thereof, the third and fourth planar surfaces defining an angle therebetween, the first strap comprises a planar surface and the second strap comprises a planar surface. The planar surface of the first strap abuts the first planar surface of the body when in the open position and the planar surface of the first strap abuts the second planar surface of the body when in the closed position, and the planar surface of the second strap abuts the third planar surface of the body when in the open position and the planar surface of the second strap abuts the fourth planar surface of the body when in the closed position. In certain of these embodiments, the angle between the first and second planar surfaces of the body is 90 degrees and the angle between the third and fourth planar surfaces of the body is 90 degrees.

In some embodiments, the device further includes a first pivot element configured to allow the first strap and the body to pivot with respect to one another, while preventing the first strap and the body from separating and a second pivot element configured to allow the second strap and the body to pivot with respect to one another, while preventing the second strap and the body from separating.

In accordance with a further aspect of the present invention, a band configured to wrap around and be secured to an object includes a first member having first and second ends, a second member pivotably connected to the first member at the first end thereof and a third member pivotably connected to the first member at the second end thereof. The first, second and third members are pivotable with respect to each other between an open position and a closed position. One of the second member and the first member comprises a first permanent magnet disposed adjacent the first end of the first member and the other of the second member and the first member comprises a second permanent magnet or a first ferrous material disposed adjacent the first end of the first member. One of the third member and the first member comprises a third permanent magnet disposed adjacent the second end of the first member and the other of the third member and the first member comprises a fourth permanent magnet or a second ferrous material disposed adjacent the second end of the first member. The first and second members are configured such that when the first and second members are pivoted with respect to each other past a threshold position toward the closed position, the first and second members are biased toward the closed position by forces created between the first magnet and the second magnet or the first ferrous material, and when the first and second members are pivoted with respect to each other past the threshold position toward the open position, the first and second members are biased toward the open position by forces created between the first magnet and the second magnet or the first ferrous material. The first and third members are configured such that when the first and third members are pivoted with respect to each other past a threshold position toward the closed position, the first and third members are biased toward the closed position by forces created between the third magnet and the fourth magnet or the second ferrous material, and when the first and third members are pivoted with respect to each other past the threshold position toward the open position, the first and third members are biased toward the open position by forces created between the third magnet and the fourth magnet or the second ferrous material.

The present invention, as set out above in various respects, provides a band, such as a watch band or other wearable band, that is suitable for very simple one handed or hands free operation and that can assemble around a body part upon being positioned onto the body part with little, if any, input required for the wearer to activate/trigger the band from the opened to the closed position.

Other features and advantages of the invention will become more apparent from consideration of the following drawings and written description.

BRIEF DESCRIPTION OF THE DRAWINGS

FIG. 2 is a side elevational schematic view of an exemplary embodiment of a bistable magnetic actuator that may be employed by a band configured in accordance with an exemplary embodiment of the present invention;

FIGS. 3A-3C are side elevational schematic views of the magnetic actuator of FIG. 2 illustrating the actuator in the stable open position (FIG. 3A), the stable closed position (FIG. 3C) and the intermediate unstable position (FIG. 3B);

FIG. 6 is a side elevational view of a watch incorporating a band configured in accordance with an exemplary embodiment of the present invention incorporating a pair of the magnetic actuators of FIG. 2, with the band being defined by a plurality of bistable compliant links combined with a plurality of passive links and a closure;

FIG. 7 is a side elevational view of a watch incorporating a band configured in accordance with an exemplary embodiment of the present invention incorporating a pair of the magnetic actuators of FIG. 2, with the band being defined by a plurality of bistable compliant links and no closure;

FIG. 9A and FIG. 9B are side isometric views of a band, shown respectively in an open position and a closed position, configured in accordance with the present invention, where the band is employed as a cuff closure for medical scrubs or the like;

FIG. 10A and FIG. 10B are side elevational views of a band, shown respectively in an open position and a closed position, configured in accordance with the present invention, where the band is employed as a wrap to secure heat packs, cold packs or the like; and FIG. 11A and FIG. 11B are side isometric views of a band, shown respectively in an open position and a closed position, configured in accordance with the present invention, where the band is employed as a safety tether for a gaming device or the like.

DETAILED DESCRIPTION OF THE INVENTION

Figure 1A:
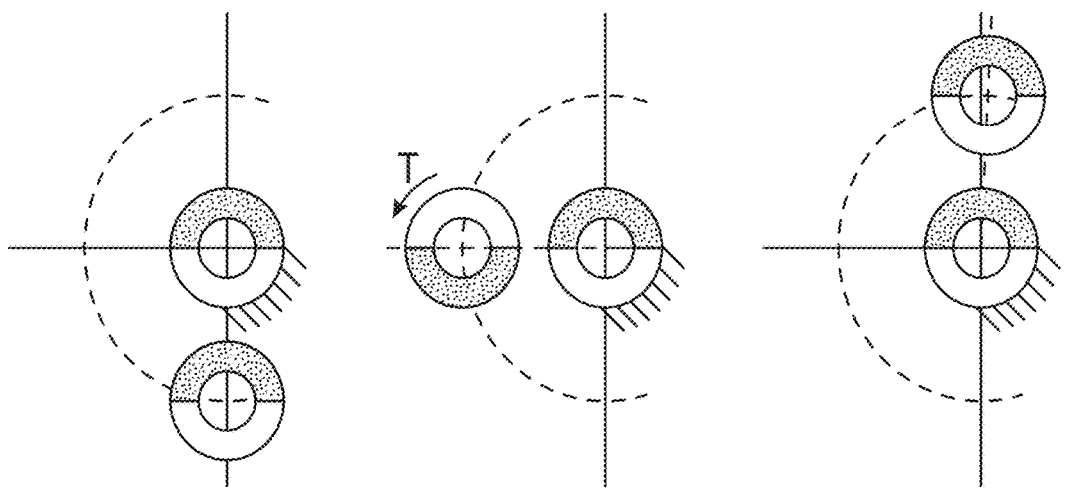
FIG. 1A and FIG. 1B schematically and graphically depict a force-deflection response for an exemplary bistable magnetic arrangement.
Figure 1B:
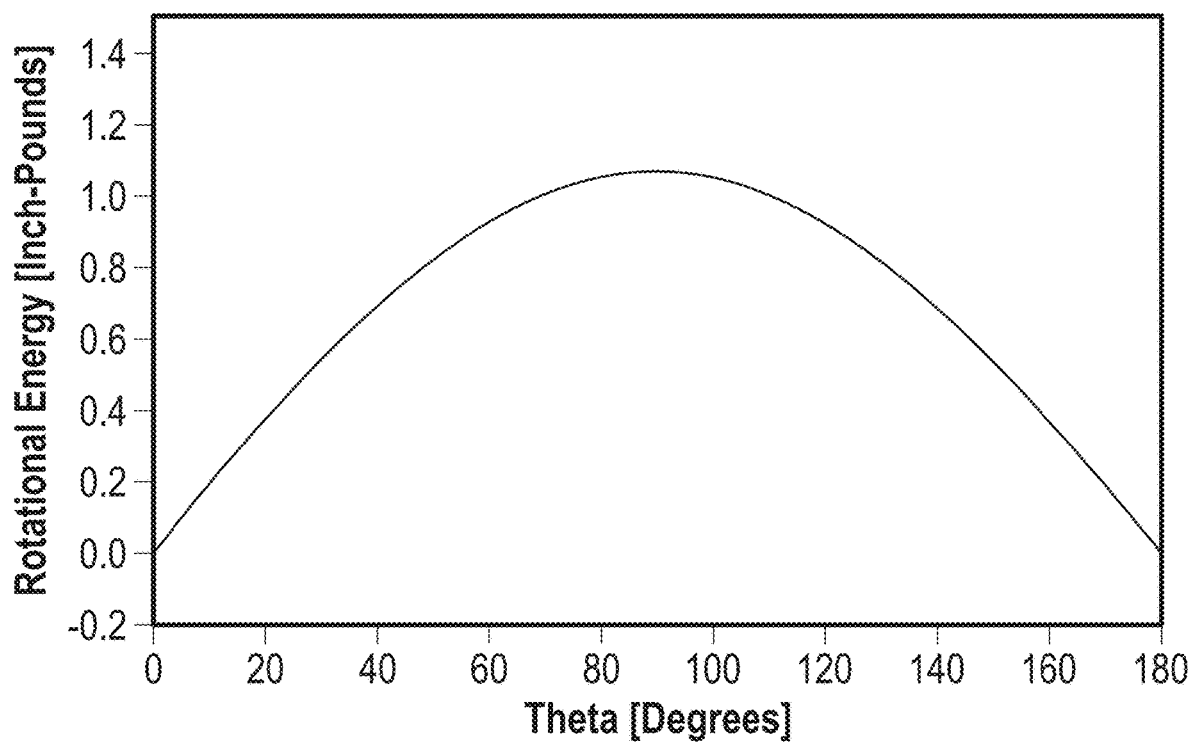

The present invention may be further understood with reference to the following description and the appended drawings, wherein like elements are referred to with the same reference numerals. Many of the exemplary embodiments of the present invention describe bands used as wearables configured to wrap around a body part (e.g., a wrist, an ankle, etc.) of a wearer. It should be understood, however, that the present invention may be implemented in various other configurations and on various other scales, both smaller and larger than typical wearables.

FIG. 2 and FIGS. 3A-3C generally schematically illustrate a first embodiment of a bistable magnetic actuator (10) that may be employed by a band configured in accordance with exemplary embodiments of the present invention. The actuator (10) includes a first component (12) having a permanent magnet (14) embedded therein and a second component (16) having a permanent magnet (18) embedded therein.

The first and second components (12, 16) are configured such that when the first and second components (12, 16) are pivoted with respect to each other past a threshold position (shown in FIG. 3B) toward a first stable position (shown in FIG. 3A), the first and second components (12, 16) are biased toward the first stable position by forces created by the magnets (14, 18) (indicated by arrows in FIG. 3A) and when the first and second components (12, 16) are pivoted with respect to each other past the threshold position (shown in FIG. 3B) toward the second stable position (shown in FIG. 3C), the first and second components (12, 16) are biased toward the second stable position by forces created by the magnets (14, 18) (indicated by arrows in FIG. 3C).

This biasing configuration can be achieved by providing the first component (12) with a planar surface (20) and providing the second component (16) with a first planar surface (22) and a second planar surface (24), with the first and second planar surfaces (22, 24) defining an angle therebetween. As can be seen in FIG. 3A, when the planar surface (20) of the first component (12) abuts the first planar surface (22) of the second component (16), the first and second components (12, 16) are in the first stable position and as can be seen in FIG. 3C, when the planar surface (20) of the first component (12) abuts the second planar surface (24) of the second component (16), the first and second components (12, 16) are in the second stable position.

While the angle between the first and second planar surfaces (22, 24) of the second component (16) are illustrated as defining an angle therebetween of about 90 degrees, it should be understood that this angle can be smaller or larger than 90 degrees. It is also contemplated that more than two stable positions can be achieved, for example, by providing the second component (16) with more than two planar surfaces (e.g., three planar surfaces separated from one another by 45 degrees would provide three stable positions).

As should be apparent from FIG. 3A and FIG. 3C, the first and second stable positions can be maintained without external forces being applied to the first and second components (12, 16). As best seen in FIG. 3B, on the other hand, it should be recognized that rotational positions of the first and second components (12, 16) with respect to each other between the two stable positions shown in FIG. 3A and FIG. 3C comprise unstable positions so as to require external forces to be applied in order to maintain rotational positions of the first and second components (12, 16) with respect to each other.

Figure 4A:
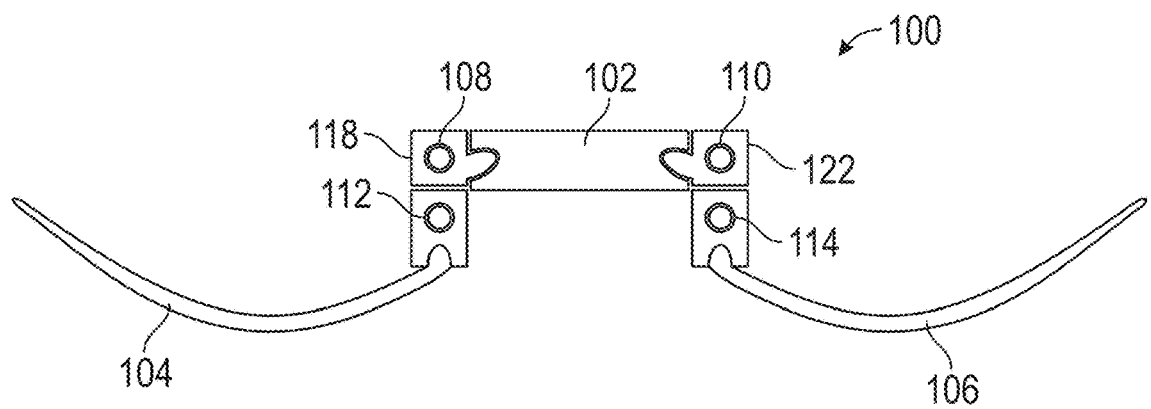
FIGS. 4A-4C are side elevational views of a watch incorporating a band configured in accordance with an exemplary embodiment of the present invention incorporating a pair of the magnetic actuators of FIG. 2 illustrating the actuators in the stable open position (FIG. 4A), the stable closed position (FIG. 4C) and the intermediate unstable position (FIG. 4B)
Figure 4B:
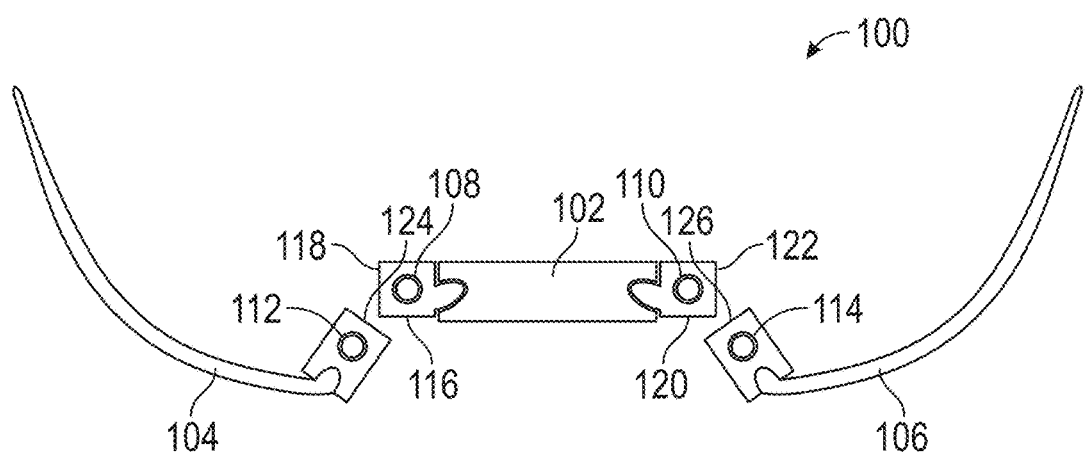
Figure 4C:
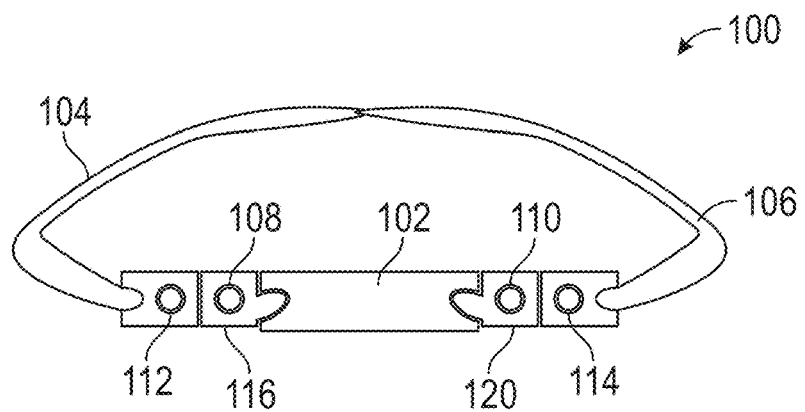

Referring now to FIGS. 4A-4C, a band (100) configured to wrap around and be secured to an object (not shown) in accordance with one particular exemplary embodiment of the present invention includes a pair of bistable magnetic actuators, as illustrated in FIG. 2 and FIGS. 3A-3C.

As shown, the band (100) includes three members (102, 104, 106) pivotably connected to one another so as to be pivotable with respect to each other between an open position (shown in FIG. 4A) and a closed position (shown in FIG. 4C). The second member (104) and the third member (106) are pivotably connected to the first member (102) at opposite ends thereof. In the particular illustrated embodiment, the first member (102) is shown to comprise a watch body, while the second member (104) is shown to comprise a first watch strap, and the third member (106) is shown to comprise a second watch strap, whereby the band (100) comprises a watch. However, it must be recognized that such is not required, and it is contemplated that the band (100) may take any of numerous forms, some other examples of which are described in more detail below.

The first member (102) comprises a first permanent magnet (108) and a second permanent magnet (110) disposed at opposite ends thereof, the second member (104) comprises a third permanent magnet (112) disposed at an end thereof and the third member (106) comprises a fourth permanent magnet (114) disposed at an end thereof. Any of various known or subsequently developed types of permanent magnets may be employed by the present invention, including ceramic magnets, alnico magnets, samarium cobalt magnets, and neodymium iron boron magnets. Moreover, the size and shape of the magnets may be varied as appropriate for the particular application, with generally cylindrical magnets being shown in FIGS. 4A-4C, and with generally rectangular magnets being shown in various other Figures.

Additionally, it should be recognized that one of the first permanent magnet (108) and the cooperating third permanent magnet (112) may be replaced with a ferrous material, and similarly that one of and the second permanent magnet (110) and the cooperating fourth permanent magnet (114) may be replaced with a ferrous material. While providing two cooperating permanent magnets generally provides stronger attraction forces, in situations where such stronger forces are not necessary, use of ferrous materials in one of the cooperating members may provide sufficient results.

The first member (102) and second member (104) are configured such that when the first and second members (102, 104) are pivoted with respect to each other past a threshold position (shown in FIG. 4B) toward the closed position (shown in FIG. 4C), the first and second members (102, 104) are biased toward the closed position (shown in FIG. 4C) by forces created by the first and third magnets (108, 112) and when the first and second members (102, 104) are pivoted with respect to each other past the threshold position (shown in FIG. 4B) toward the open position (shown in FIG. 4A), the first and second members (102, 104) are biased toward the open position (shown in FIG. 4A) by forces created by the first and third magnets (108, 112).

Similarly, the first member (102) and the third member (106) are configured such that when the first and third members (102, 106) are pivoted with respect to each other past a threshold position (shown in FIG. 4B) toward the closed position (shown in FIG. 4C), the first and third members (102, 106) are biased toward the closed position (shown in FIG. 4C) by forces created by the second and fourth magnets (110, 114) and when the first and third members (102, 106) are pivoted with respect to each other past the threshold position (shown in FIG. 4B) toward the open position (shown in FIG. 4A), the first and third members (102, 106) are biased toward the open position (shown in FIG. 4A) by forces created by the second and fourth magnets (110, 114).

Similar to above, this biasing configuration can be achieved by providing the first member (102) with a first planar surface (116) and a second planar surface (118) at a first end thereof, the first and second planar surfaces (116, 118) defining an angle therebetween, and a third planar surface (120) and a fourth planar surface (122) at a second end thereof, the third and fourth planar surfaces (120, 122) defining an angle therebetween. The second member (104) and the third member (106) are also provided with their own planar surfaces (124, 126).

As can be seen in FIG. 4A, when the planar surface (124) of the second member (104) abuts the first planar surface (116) of the first member (102), and the planar surface (126) of the third member (106) abuts the third planar surface (120) of the first member (102), the first, second and third members (102, 104, 106) are in a stable, open position and as can be seen in FIG. 4C, when the planar surface (124) of the second member (104) abuts the second planar surface (118) of the first member (102), and the planar surface (126) of the third member (106) abuts the fourth planar surface (122) of the first member (102), the first, second and third members (102, 104, 106) are in a stable, closed position.

While the angle between the first and second planar surfaces (116, 118) of the first member (102) and the angle between the third and fourth planar surfaces (120, 122) of the first member (102) are illustrated as defining angles therebetween of about 90 degrees, it should be understood that these angles can be smaller or larger than 90 degrees. It is also contemplated that more than two stable positions can be achieved, for example, by providing the ends of the first member (102) with more than two planar surfaces (e.g., three planar surfaces separated from one another by 45 degrees would provide three stable positions).

As should be apparent from FIG. 4A and FIG. 4C, the open and closed positions, being stable positions, can be maintained without external forces being applied to the first, second and third members (102, 104, 106). As best seen in FIG. 4B, on the other hand, it should be recognized that rotational positions of the second and third members (104, 106) with respect to the first member (102) between the two stable positions shown in FIG. 4A and FIG. 4C comprise unstable positions so as to require external forces to be applied in order to maintain rotational positions of the second and third members (104, 106) with respect to the first member (102).

Figure 5A:
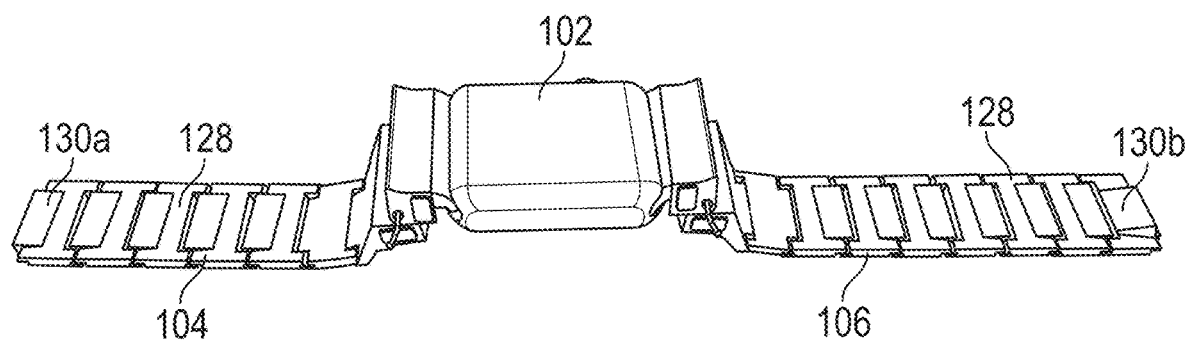
FIG. 5A and FIG. 5B are side isometric views of a watch incorporating a band configured in accordance with an exemplary embodiment of the present invention incorporating a pair of the magnetic actuators of FIG. 2, with the band being defined by a plurality of links and a closure, illustrating the actuators in the stable open position (FIG. 5A) and the stable closed position (FIG. 5B).
Figure 5B:
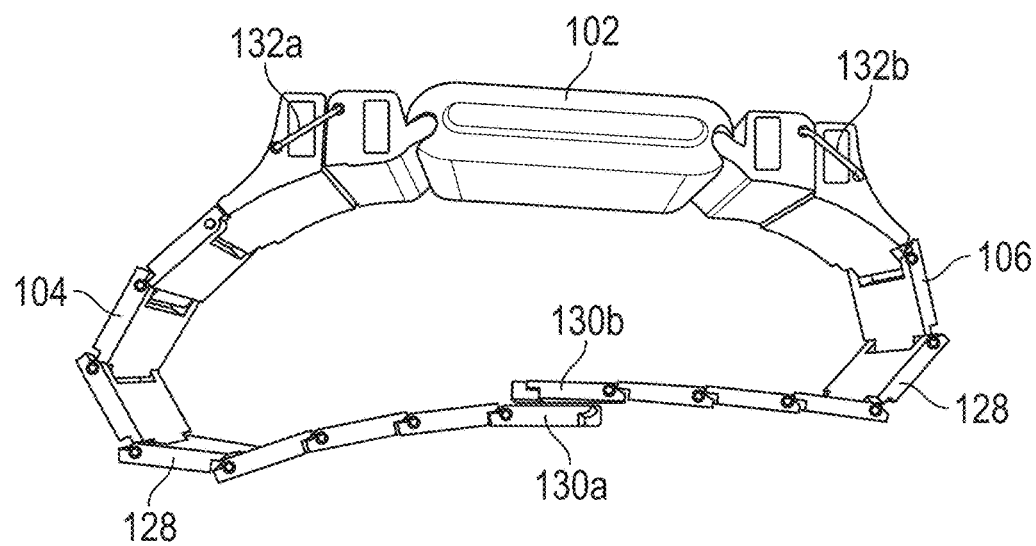

As shown in FIGS. 4A-4C, the second and third members (104, 106) may comprise a strap of flexible material, such as leather, fabric, silicone, rubber or the like. Instead, or in addition, the second and third members (104, 106) may comprise a plurality of links (128, 128') as shown in FIGS. 5A-5B, FIG. 6 and FIG. 7, such that the magnetic actuators, as discussed above, are used to trigger the opening and/or closing of the straps upon activation by a wearer, thereby facilitating one-handed operation. The links may take the form of passive links (128), as are commonly known (as shown in FIG. 5A and FIG. 5B). If desired, however, the links may take the form of active links (128'), such as being spring biased or biased by operation of bistable compliant mechanisms, as shown and described in our copending U.S. patent application Ser. No. 19/076,629, filed concurrently herewith (as shown in FIG. 7). Additionally, a combination of both passive links (128) and active links (128')—e.g., links employing the use of bistable compliant mechanisms can be provided, as shown in FIG. 6.

Also as shown in FIG. 5A, FIG. 5B and FIG. 6, the second and third members (104, 106) may be provided with a clasp or closure mechanism (130a, 130b) at ends thereof opposite to their ends pivotably connected to the first member (102), so as to provide for affixing of the second member (104) and the third member (106) together when the second and third members (104, 106) are in the closed position (shown in FIG. 5B). The clasp/closure (130a, 130b) may take the form of a magnetic closure or the like, although such is not required.

Also as best seen in FIG. 5B, a first pivot element (132a) is provided, which is configured to allow the first and second members (102, 104) to pivot with respect to one another, while preventing the first and second members (102, 104) from separating, while a second pivot element (132b) is provided, which is configured to allow the first and third members (102, 106) to pivot with respect to one another, while preventing the first and third members (102, 106) from separating. The first and second pivot elements (132a, 132b) may take any of numerous forms, such as spring clips having an extended u-shaped, square-backed cross section, as pictured. Of course, other options will be readily apparent to those skilled in the art.

It is contemplated that the first, second and third members (102, 104, 106) configured in accordance with the present invention can be employed in a wide variety of applications. As discussed above in detail, FIGS. 4A-7 show embodiments where the first member (102) comprises a watch body and where the second and third members (104, 106) comprise straps for a watch band, such that the invention is implemented in a watch. However, many other applications are envisioned. Moreover, it is contemplated that more than three members may be employed. For example, there may be provided multiple double-sided members, similar to the first member (102) connected end-to-end between two single ended members, similar to second and third members (104, 106) in order to define an elongated and flexible band, such as an article of jewelry (e.g., a bracelet). Several further exemplary embodiments for use in various applications are now discussed.

Figure 8A:
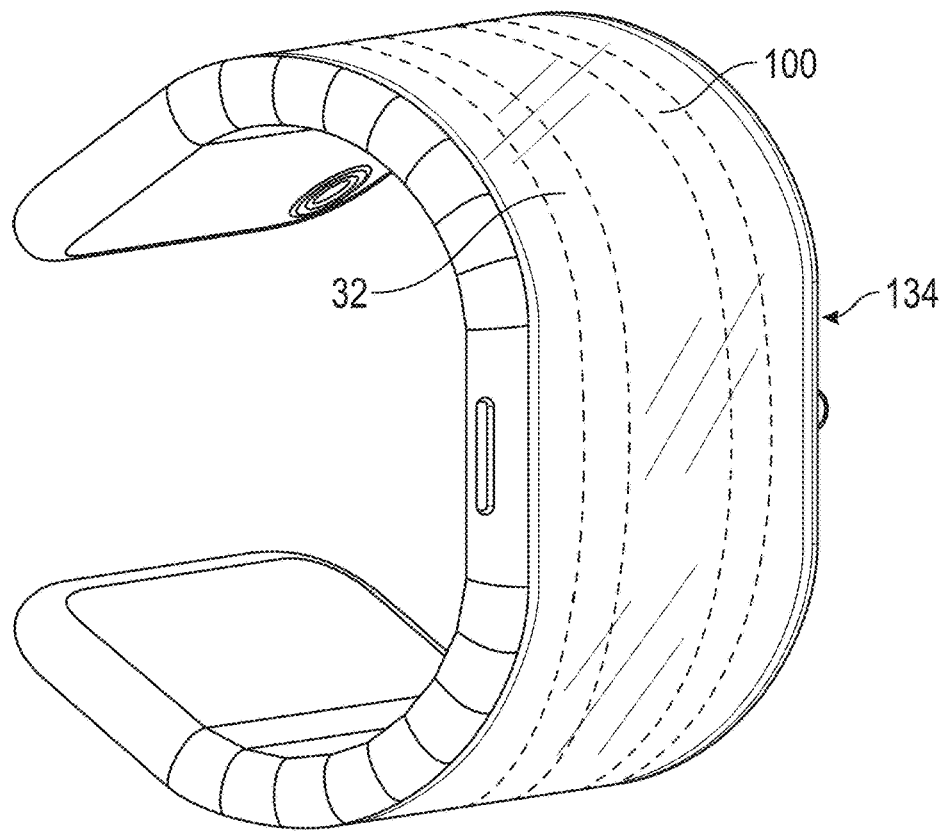
FIG. 8A and FIG. 8B are side isometric views of a flexible mobile communications device, such as a mobile phone, adapted to wrap around a body part, shown respectively alone and as applied to the wrist of a wearer, incorporating at least one band configured in accordance with the present invention.
Figure 8B:
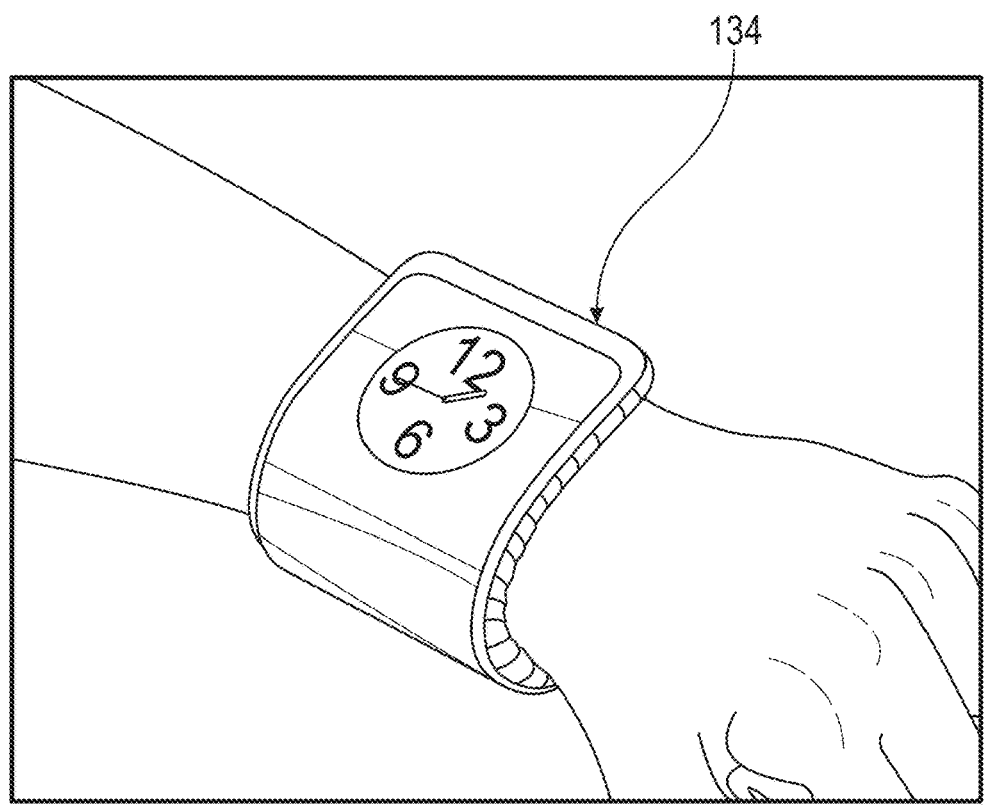

FIG. 8A shows two bands (100) configured in accordance with the present invention embedded into (as indicated by dashed lines) a flexible mobile communications device (134), such as a flexible mobile phone. The bands (100) are adapted to allow the flexible mobile communications device (134) to be wrapped around a body part, such as a wrist, and secure it in place (as shown in FIG. 8B). Two bands (100) are illustrated, although it should be understood that a single band, or more than two bands, may be employed. It is also contemplated that one or more bands according to the present invention may be attached externally to a mobile communications device, as if the device was a large watch. In such instance (i.e., an external closure maintenance mechanism), the band(s) may be provided with or without a clasp, closure or the like, as discussed herein with respect to watch band embodiments. This would allow the wearer to position/anchor/affix the mobile communications device to the wrist once the device is bent into an appropriate position.

Figure 9A:
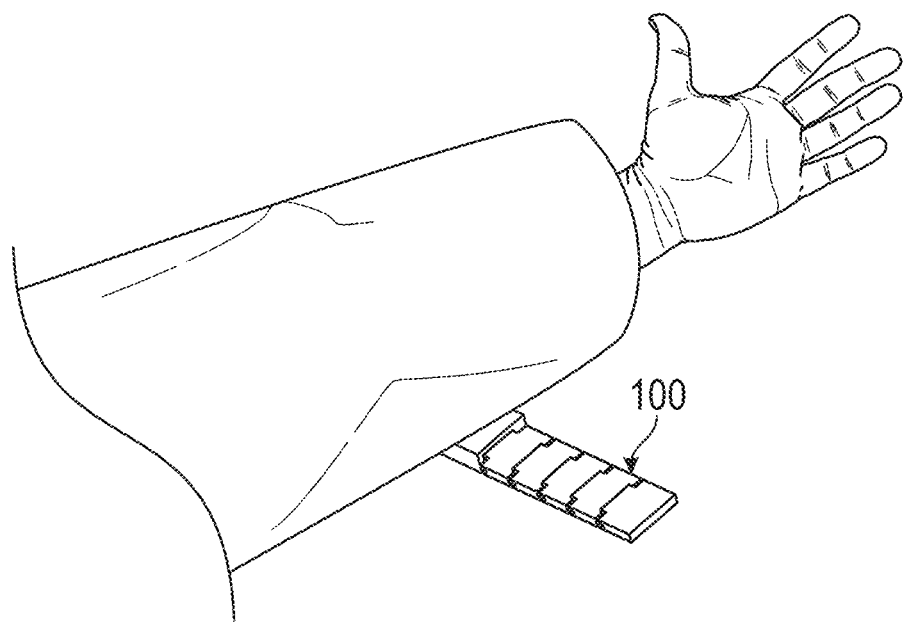
Figure 9B:
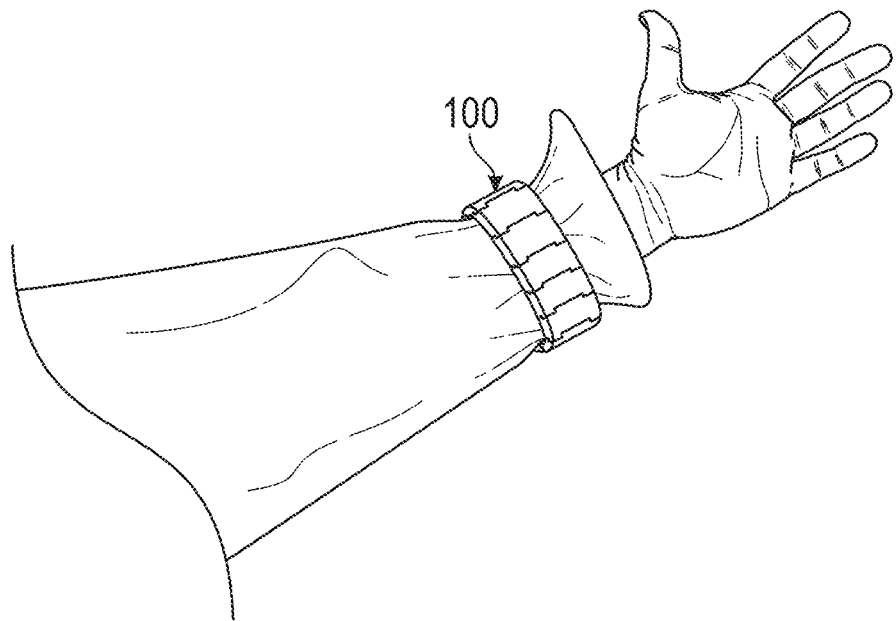

It is also contemplated to employ that the bands (100) configured in accordance with the present invention in connection with a wide variety of medical applications. For example, a band (100) according to the present invention may be used as a cuff attachment to secure and hold the cuffs of medical scrubs around the wrists of a wearer, as shown in FIG. 9A and FIG. 9B. Other similar, non-medical, applications are also contemplated. For example, the bands (100) can be incorporated into smart clothing, such as belts, shirts, or pants or clothing needed under special, environmental conditions, such as space or fire suits, to facilitate personalized fitting in combination with or as an alternative to elastic or hook-and-loop (i.e., Velcro®) type fasteners.

Figure 10A:
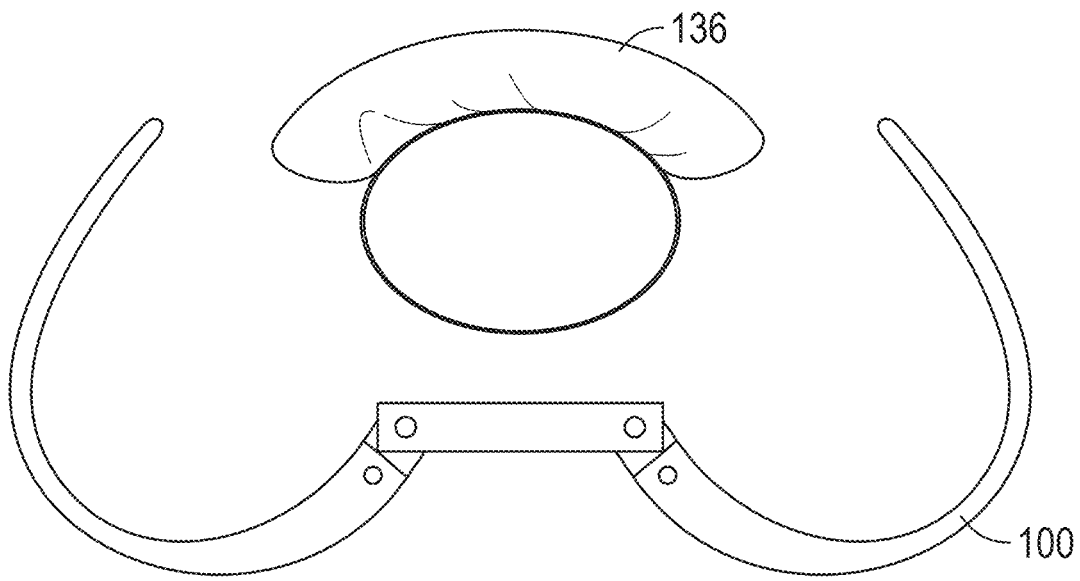
Figure 10B:
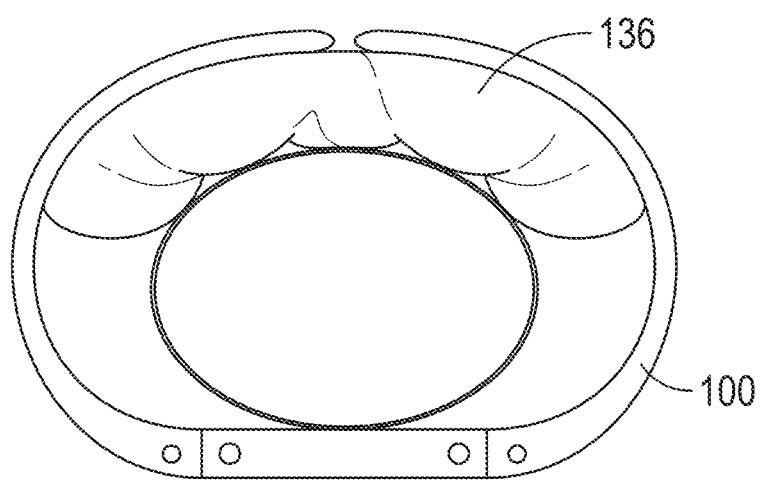

Another medical application is shown in FIG. 10A and FIG. 10B, wherein a plurality of heat or cold packs (136) or the like may be affixed to a body part, such as an upper or lower extremity, by employing one or more bands (100) according to the present invention. In other examples of medical uses, one or more bands (100) in accordance with the present invention may be employed in connection with compression bandages, blood pressure cuffs, etc.

Figure 11A:
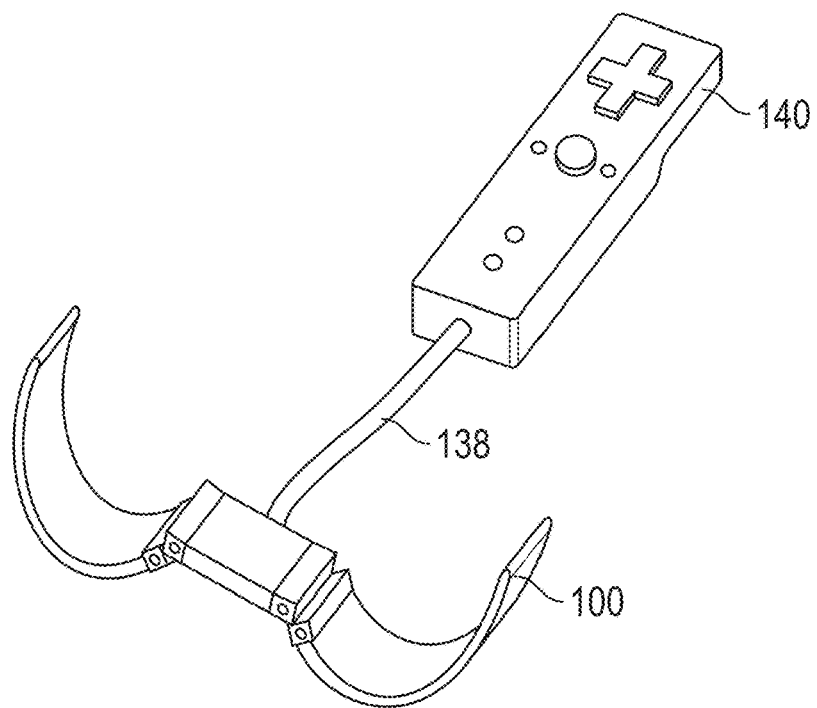
Figure 11B:
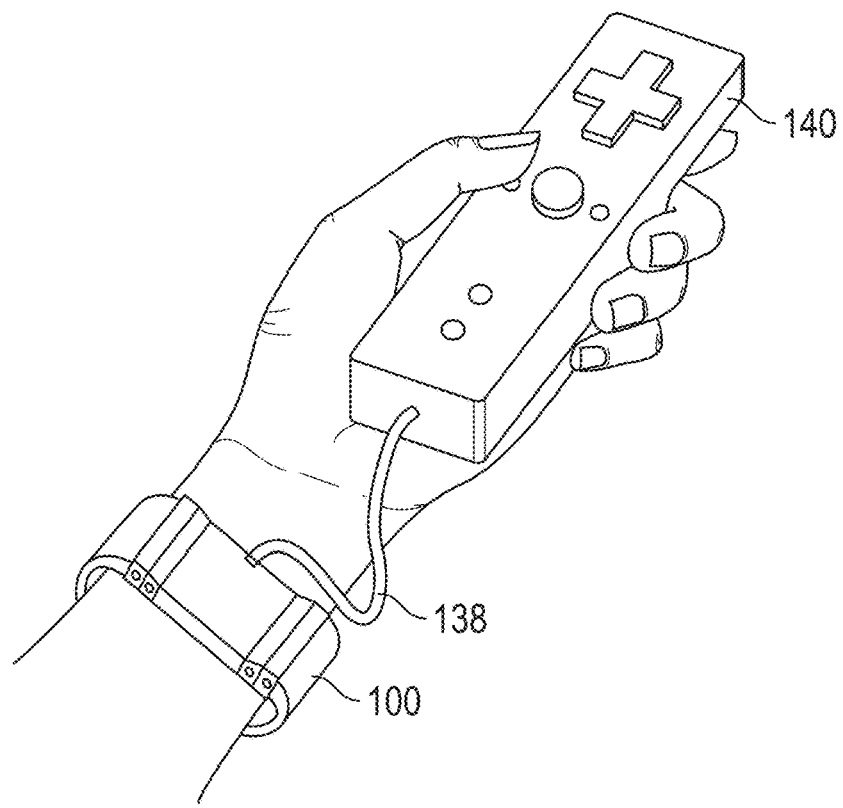

FIG. 11A and FIG. 11B show another exemplary use, wherein a band (100) in accordance with the present invention may be used in connection with a safety tether (138) for a gaming device (140) to attach the device to a player's wrist, such that it is not accidentally thrown during gameplay.

While most of the aforementioned uses contemplated for bands (100) in accordance with the present invention involve use as a wearable of some kind (i.e., a device configured to be wrapped around a body part), it is also envisioned that the bands (100) may be used in significantly different applications.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A band configured to wrap around and be secured to an object, said band comprising:
    at least three members pivotably connected to one another so as to be pivotable with respect to each other between an open position and a closed position;
    wherein a first member of said at least three members comprises a first permanent magnet and a second permanent magnet disposed at opposite ends thereof, wherein a second member of said at least three members comprises a third permanent magnet and wherein a third member of said at least three members comprises a fourth permanent magnet;
    wherein the first and second members are configured such that when the first and second members are pivoted with respect to each other past a threshold position toward the closed position, the first and second members are biased toward the closed position by forces created by the first and third magnets and when the first and second members are pivoted with respect to each other past the threshold position toward the open position, the first and second members are biased toward the open position by forces created by the first and third magnets; and
    wherein the first and third members are configured such that when the first and third members are pivoted with respect to each other past a threshold position toward the closed position, the first and third members are biased toward the closed position by forces created by the second and fourth magnets and when the first and third members are pivoted with respect to each other past the threshold position toward the open position, the first and third members are biased toward the open position by forces created by the second and fourth magnets.

2. The band of claim 1, wherein the second and third members are pivotably connected to the first member at opposite ends thereof.

3. The band of claim 2, wherein the first member comprises a watch body, wherein the second member comprises a first watch strap, and wherein the third member comprises a second watch strap, whereby the band comprises a watch.

4. The band of claim 1 further comprising a closure affixing the second member and the third member together when the second and third members are in the closed position.

5. The band of claim 4 wherein the closure comprises a magnetic closure.

6. The band of claim 1 wherein at least one of the second member and the third member comprises a flexible material.

7. The band of claim 1 wherein at least one of the second member and the third member comprises a plurality of links.

8. The band of claim 7 wherein at least some of the plurality of links comprise bistable compliant links.

9. The band of claim 7 wherein at least some of the plurality of links comprise passive links.

10. The band of claim 7 wherein the plurality of links comprise a combination of bistable compliant links and passive links.

11. The band of claim 1, wherein the open position and the closed position comprise stable positions such that the open position and the closed position are maintained without external forces being applied thereto.

12. The band of claim 11, wherein rotational positions of the first and second members with respect to each other and rotational positions of the first and third members with respect to each other between the open position and the closed position comprise unstable positions so as to require external forces to be applied in order to maintain rotational positions of the first and second members with respect to each other and rotational positions of the first and third members with respect to each other between the open position and the closed position.

13. The band of claim 1:
    wherein the first member comprises a first planar surface and a second planar surface at a first end thereof, the first and second planar surfaces defining an angle therebetween;
    wherein the first member comprises a third planar surface and a fourth planar surface at a second end thereof, the third and fourth planar surfaces defining an angle therebetween;
    wherein the second member comprises a planar surface;
    wherein the third member comprises a planar surface;
    wherein the planar surface of the second member abuts the first planar surface of the first member when in the open position and the planar surface of the second member abuts the second planar surface of the first member when in the closed position; and
    wherein the planar surface of the third member abuts the third planar surface of the first member when in the open position and the planar surface of the third member abuts the fourth planar surface of the first member when in the closed position.

14. The band of claim 13 wherein the angle between the first and second planar surfaces of the first member is 90 degrees and the angle between the third and fourth planar surfaces of the first member is 90 degrees.

15. The band of claim 1 further comprising:
a first pivot element configured to allow the first and second members to pivot with respect to one another, while preventing the first and second members from separating; and
a second pivot element configured to allow the first and third members to pivot with respect to one another, while preventing the first and third members from separating.

16. The band of claim 1 wherein the band defines an article of jewelry or a watch.

17. The band of claim 1 wherein the band defines a medical article selected from the group consisting of a medical instrument holder, a cuff attachment for scrubs, a compression bandage, a blood pressure cuff, and a cuff for affixing cold or heat wraps.

18. The band of claim 1 wherein the band defines a safety tether for a gaming device.

19. The band of claim 1 wherein the band is incorporated into a flexible mobile communications device adapted to wrap around a body part.

20. A wearable device comprising:
a body;
a first strap pivotably connected at an end thereof to a first end of the body and a second strap pivotably connected at an end thereof to a second end of the body, opposite the first end; the first and second straps being pivotable with respect to the body between an open position and a closed position;
wherein the first strap comprises a permanent magnet adjacent the end thereof, the second strap comprises a permanent magnet adjacent the end thereof;
wherein the body comprises a first permanent magnet adjacent the first end thereof and a second permanent magnet adjacent the second end thereof;
wherein the first strap and the body are configured such that when the first strap and the body are pivoted with respect to each other past a threshold position toward the closed position, the first strap and the body are biased toward the closed position by forces created by the magnet of the first strap and the first magnet of the body and when the first strap and the body and are pivoted with respect to each other past the threshold position toward the closed position, the first strap and the body are biased toward the closed position by forces created by the magnet of the first strap and the first magnet of the body; and
wherein the second strap and the body are configured such that when the second strap and the body are pivoted with respect to each other past a threshold position toward the closed position, the second strap and the body are biased toward the closed position by forces created by the magnet of the second strap and the second magnet of the body and when the second strap and the body and are pivoted with respect to each other past the threshold position toward the closed position, the second strap and the body are biased toward the closed position by forces created by the magnet of the second strap and the second magnet of the body.

21. The device of claim 20, wherein the body comprises a watch body and wherein the first and second straps comprise watch straps, whereby the device comprises a watch.

22. The device of claim 20 further comprising a closure affixing the first strap and the second strap together when the first strap and the second strap are in the closed position.

23. The device of claim 22 wherein the closure comprises a magnetic closure.

24. The device of claim 20 wherein at least one of the first strap and the second strap comprises a flexible material.

25. The device of claim 20 wherein at least one of the first strap and the second strap comprises a plurality of links.

26. The device of claim 25 wherein the plurality of links comprise a combination of bistable compliant links and passive links.

27. The device of claim 25 wherein at least some of the plurality of links comprise bistable compliant links.

28. The device of claim 25 wherein at least some of the plurality of links comprise passive links.

29. The device of claim 20, wherein the open position and the closed position comprise stable positions such that the open position and the closed position are maintained without external forces being applied thereto.

30. The device of claim 29, wherein rotational positions of the first strap and second strap with respect to the body between the open position and the closed position comprise unstable positions so as to require external forces to be applied in order to maintain rotational positions of the first strap and the second strap with respect to the body between the open position and the closed position.

31. The device of claim 20:
wherein the body comprises a first planar surface and a second planar surface at the first end thereof, the first and second planar surfaces defining an angle therebetween;
wherein the body comprises a third planar surface and a fourth planar surface at the second end thereof, the third and fourth planar surfaces defining an angle therebetween;
wherein the first strap comprises a planar surface;
wherein the second strap comprises a planar surface;
wherein the planar surface of the first strap abuts the first planar surface of the body when in the open position and the planar surface of the first strap abuts the second planar surface of the body when in the closed position; and
wherein the planar surface of the second strap abuts the third planar surface of the body when in the open position and the planar surface of the second strap abuts the fourth planar surface of the body when in the closed position.

32. The device of claim 31 wherein the angle between the first and second planar surfaces of the body is 90 degrees and wherein the angle between the third and fourth planar surfaces of the body is 90 degrees.

33. The device of claim 20 further comprising a first pivot element configured to allow the first strap and the body to pivot with respect to one another, while preventing the first strap and the body from separating and a second pivot element configured to allow the second strap and the body to pivot with respect to one another, while preventing the second strap and the body from separating.

34. A band configured to wrap around and be secured to an object, said band comprising:
a first member having first and second ends;
a second member pivotably connected to the first member at the first end thereof;
a third member pivotably connected to the first member at the second end thereof;

wherein the first, second and third members are pivotable with respect to each other between an open position and a closed position;

wherein one of the second member and the first member comprises a first permanent magnet disposed adjacent the first end of the first member and the other of the second member and the first member comprises a second permanent magnet or a first ferrous material disposed adjacent the first end of the first member;

wherein one of the third member and the first member comprises a third permanent magnet disposed adjacent the second end of the first member and the other of the third member and the first member comprises a fourth permanent magnet or a second ferrous material disposed adjacent the second end of the first member;

wherein the first and second members are configured such that when the first and second members are pivoted with respect to each other past a threshold position toward the closed position, the first and second members are biased toward the closed position by forces created between the first magnet and the second magnet or the first ferrous material, and when the first and second members are pivoted with respect to each other past the threshold position toward the open position, the first and second members are biased toward the open position by forces created between the first magnet and the second magnet or the first ferrous material; and wherein the first and third members are configured such that when the first and third members are pivoted with respect to each other past a threshold position toward the closed position, the first and third members are biased toward the closed position by forces created between the third magnet and the fourth magnet or the second ferrous material, and when the first and third members are pivoted with respect to each other past the threshold position toward the open position, the first and third members are biased toward the open position by forces created between the third magnet and the fourth magnet or the second ferrous material.

\* \* \* \* \*